United States Patent

[11] 3,603,129

[72] Inventors: Benjamin Williams, Grand Island; Edward F. Yendall, Kenmore, both of, N.Y.
[21] Appl. No.: 18,811
[22] Filed: Mar. 2, 1970
[45] Patented: Sept. 7, 1971
[73] Assignee: Union Carbide Corporation
Continuation of application Ser. No. 784,519, Nov. 25, 1968, now abandoned, which is a division of application Ser. No. 547,118, Apr. 1, 1966, now Patent No. 3,417,975, which is a continuation of application Ser. No. 417,264, Dec. 1, 1964, now abandoned, which is a continuation of application Ser. No. 84,807, Jan. 25, 1961, now abandoned.

[54] APPARATUS FOR LIQUID-GAS CONTACTING TRAY
2 Claims, 8 Drawing Figs.

[52] U.S. Cl. .................................................. 72/324, 72/379, 29/163.5, 113/118
[51] Int. Cl. .................................................. B21d 28/24, B21d 28/26, B21d 31/02
[50] Field of Search .................................................. 29/157.3, 158.6, 163.5; 72/324, 325, 326, 379; 113/116, 118; 261/113, 114

[56] References Cited
UNITED STATES PATENTS

| | | | |
|---|---|---|---|
| 2,246,258 | 6/1941 | Lehman | 113/118 |
| 2,784,953 | 3/1957 | Ng | 261/114 |
| 3,062,517 | 11/1962 | Voetter et al. | 261/114 |
| 3,101,690 | 8/1963 | O'Day et al. | 29/163.5 |
| 3,196,818 | 7/1965 | Suñe et al. | 29/163.5 |

Primary Examiner—Charles W. Lanham
Assistant Examiner—E. M. Combs
Attorneys—Paul A. Rose, Leo A. Plum, John C. Le Fever and Thomas I. O'Brien ABSTRACT: A distillation tray formed from a perforated sheet with raised slot openings through which a minor part of the vapor flows with a horizontal thrust component to induce liquid flow and reduce the hydrostatic gradient.

INVENTORS
BENJAMIN WILLIAMS
BY EDWARD F. YENDALL
ATTORNEY

PATENTED SEP 7 1971

INVENTORS
BENJAMIN WILLIAMS
BY EDWARD F. YENDALL

John C. LeVine

ATTORNEY

APPARATUS FOR LIQUID-GAS CONTACTING TRAY

This is a continuation of Ser. No. 784,519, filed Nov. 25, 1968, now abandoned, which was a division of application Ser. No. 547,118 filed Apr. 1, 1966, now U.S. Pat. No. 3,417,975 which is a continuation of application Ser. No. 417,264 filed Dec. 1, 1964 and now abandoned, which was in turn a continuation of Ser. No. 84,807 filed Jan. 25, 1961 and also abandoned.

This invention relates to an improved liquid gas or liquid-vapor contacting device, and more particularly, to a liquid gas or liquid-vapor contacting tray of the type used in distillation and absorption operations and process for its use.

In recent years, the unit operations of absorption and distillation have come to play a major role in the chemicals industry. As more and more emphasis is placed on these operations, the physical size of distillation or absorption columns, and their associated accessories, have grown accordingly. New problems heretofore unknown have arisen when the size of these columns is increased. A new and larger distillation column for example may be installed to increase the capacity of existing facilities only to find that unexpected inefficiencies within the column severely restrict its rated capacity thereby offering little or no advantage over existing facilities. One such problem facing the distillation art in recent years has been the decrease in tray efficiency as the size of the tray is increased to accommodate larger liquid and vapor loads.

In conventional trays and plates for liquid gas contact columns, the liquid is induced to flow across the tray by a liquid level gradient, or hydrostatic head difference, inherently established on the tray to overcome liquid flow resistance. In small diameter trays, the liquid flow path is short and the gradient is small, and reasonably good performance can be obtained without special provisions to improve liquid distribution. Such small diameter trays may be constructed in the form of level, flat perforated metal surfaces or the conventional bubble cap tray may be used.

In larger diameter columns, however, the liquid path is longer, liquid rate per unit tray width is greater, and a considerable difference in liquid depth will exist on a flat tray between the inlet and the outlet weir. This greater difference in liquid depth now becomes a severe problem in effective tray design and operation. The greater depth of liquid near the tray inlet presents a greater resistance to vapor bubbling than the shallow depth near the outlet weir. In general, nonuniformity of bubbling results; that is, bubbling is more vigorous at the tray outlet than at the tray inlet. In the extreme case, if the gradient is sufficiently high, the tray may cease to bubble altogether at the inlet, resulting in dumping of the liquid over this inactive region, while violent bubbling or even vapor blowing occurs at the outlet. In any event, phase equilibrium between the liquid and the vapor will not be obtained and the tray efficiency will be low.

The adverse effects of relying on hydrostatic gradient to promote flow are particularly acute in a circular flow tray in which the liquid flows in a circular path, perhaps 320° around a central dummy or cap. Obviously, the flow path will be much longer near the outer circumference of the tray than near the center, and yet, the same hydrostatic gradient theoretically exists for promoting flow around all paths regardless of the radius. This means that liquid flowing near the outer circumference will proceed very slowly and may actually become stagnant, while liquid flowing near the center will traverse the tray very rapidly. This has the effect of varying the reflux ratio drastically between different areas on a given tray, causing a net loss in tray efficiency.

One method of eliminating liquid gradients is discussed in U.S. Pat. No. 2,306,367 to J. G. Benson et al. This patent teaches that by pitching or sloping the tray surface between the inlet and the overflow weir, the difference in liquid depth may be partially or wholly eliminated. Furthermore, by the use of radial baffles on a circular flow tray, the liquid residence at all flow radii may be made uniform. While this innovation represents a considerable improvement over the unbaffled, flat tray, it nevertheless contains certain disadvantages which become more severe in larger columns and in columns where production rates vary considerably. Pitching the trays is quite expensive and delicate, and the pitch which is designed into a given tray can only neutralize the hydrostatic gradient for one particular liquid load condition. Changing the load condition on the tray causes it to be either over or under pitched. In any one rectification column, flow conditions may very considerably at different levels between feed and withdrawal points, and it is clear that each level would require a special tray construction in order to obtain optimum efficiency corresponding to each flow condition. Furthermore, present-day columns are required to operate at varying feed and/or production rates and the pitched tray is too inflexible to be well adapted to such rangeability. The provision of radial baffles is also expensive and their employment is rather specific for one particular load condition on the tray. Baffles also add more resistance to liquid flow and therefore intensify the gradient problem.

Another method of eliminating liquid gradients from liquid inlet to liquid outlet on liquid gas contacting trays is by means of a vapor-jet tray. The apertures of the vapor-jet tray are either inclined or parallel to the surface of the tray. Each aperture acts as a vapor jet originating beneath the surface of the liquid which causes the liquid in its immediate vicinity to move in the direction of the jet. By orienting the apertures in the desired direction of liquid flow, the liquid may be boosted across the tray without relying upon hydrostatic gradient. However, an important disadvantage of such trays stems from the fact that the total horizontal driving force available in all the vapor passing through inclined apertures on such trays is usually far greater than that required for neutralization only of the hydrostatic gradient on the tray. A reverse hydrostatic gradient is easily encountered wherein the liquid builds up to excessive depth near the downcomer and runs too shallow near the inlet. Thus, overcompensation introduces the same problems as are encountered as with normal gradient in standard sieve or bubble cap trays.

The reverse hydrostatic effect in known vapor jet trays may be quite extreme. In at least one known example, the excessive kinetic energy of the vapor has been utilized to deliberately cause the liquid to build up on certain selected areas of the tray. In these selected areas, the liquid depth is so great that the tray weeps, i.e. the liquid drips through the vapor apertures under the excessive hydrostatic head. The object is to avoid having to provide a specific mechanical downcomer for conducting the liquid to the tray below. It is apparent, however, that the extreme variation of liquid depth existing on such a tray produces the same disadvantages met in conventional sieve and bubble cap trays.

An object of this invention is to provide an improved liquid gas contacting tray which distributes the process liquid contained thereon uniformly over the surface of the tray thereby achieving maximum tray efficiency.

Thus, the inflexibility of known vapor-jet trays makes it extremely difficult to build a tray of this type which provides a satisfactory balance between factors such as pressure drop, bubble formation, and hydrostatic gradient. A tray designed for one specific load condition may be entirely unsatisfactory at another condition.

A further object of this invention is to provide a liquid gas contacting tray which is able to operate efficiently over a considerable range or process liquid and vapor loads.

A still further object of this invention is to provide a liquid gas contacting tray which is easily and economically fabricated and installed.

A still further objective is to provide liquid-vapor or liquid gas contacting processes employing the unique tray design of this invention.

Figure 4:
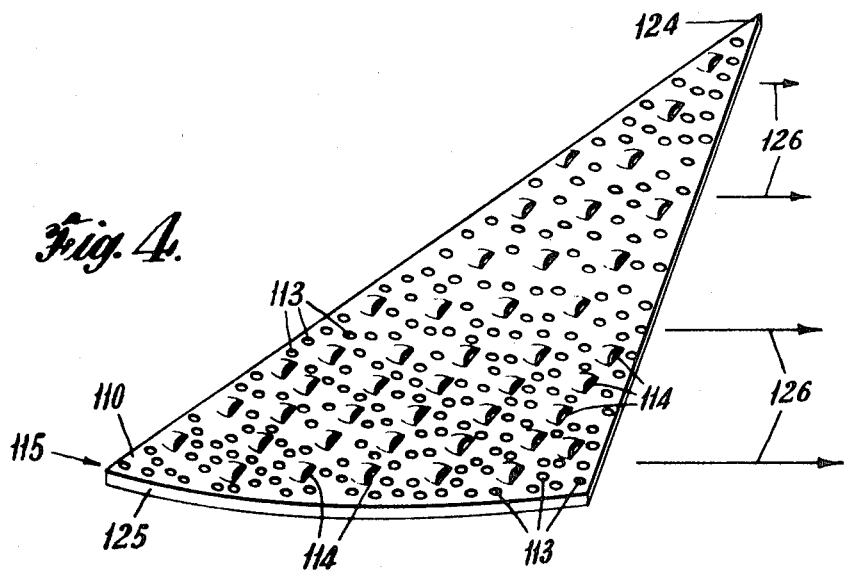

FIG. 4 is a perspective view of a segmental section from an circular tray of the circular flow type illustrating the variation of aperture density from the center of the tray to the periphery of the tray. A qualitative representation of the velocity profile across the tray surface is shown by the increasing size of the velocity vector as the periphery of the tray is approached; and FIG. 5, consisting of four parts, 5a, 5b, 5c and 5d, illustrates several embodiments of apertures which may be employed as alternatives to the particular and preferred aperture construction illustrated and discussed herein.

For the purpose of orientating the viewer to the various illustrations depicting a flow of liquid on the gas-liquid contacting tray as well as orienting the viewer to those views in which no liquid is shown on the illustrated tray of this invention, for all side views illustrated herein, the flow of liquid is or would be horizontal and perpendicular to the viewer's line of sight. In all front views, the flow of liquid will or would be directly at the viewer.

According to this invention a selected number of apertures are formed by causing rectangular portions of a material having perforations extending therethrough, such as sieve plate material, to be raised above the plane of the surface of the material and one edge of the raised section to be completely sheared away from the material. The shape of the raised section resembles a "lean-to" having walls. The opening or front of the raised sections thus formed produces an aperture plane which contains the edges of the material which have been separated. Depending upon the method used to cause the raised sections to be formed, the aperture plane, containing the aperture may be caused to be inclined at some oblique angle or be normal to the plane of the tray. A selected number of these apertures having an aperture plane inclined or normal to the tray surface are provided on a flat, horizontal tray so as to induce liquid flow and substantially reduce the hydrostatic gradient existing from liquid inlet to liquid outlet. The remainder and largest portion of the free area required for vapor flow is provided by perforations integral with and terminating at the tray surface. The perforations integral with the tray are preferably in the form of small sieve-type openings distributed uniformly over the tray surface. In this way, only a portion of the vapor is utilized to promote liquid flow, the remainder being used to form a mass of tiny bubbles through the process liquid on the tray. By the present invention, a new degree of flexibility is introduced into tray construction which allows optimization of pressure drop, liquid propulsion and bubble formation. Trays constructed in accordance with this concept exhibit low pressure drop and a uniform high degree of bubbling activity. The trays are also characterized by high rangeability, the tendency to weep at relatively low flow rates or to entrain liquid at high flow rates is reduced; this permits a rectification column to operate with high efficiency at production capacities both well above and well below the average capacity for which it was rated. This is an important advantage, particularly where a liquid gas contact installation serves a single consumer having a variable demand.

Of great advantage is the fact that one designing and distributing the apertures having aperture planes inclined or normal to the tray surface need consider only the gradient problem and need not consider problems of accommodating the total vapor flow. In many instances, only perhaps 10 percent to 20 percent of the total open area on the tray need be provided as inclined or normal apertures; the balance being normal perforations in standard sieve material. Since the total open area is usually a small fraction (e.g. 10 percent) of the total tray surface, it is clear that a total inclined aperture area on the order of 1 percent to 2 percent of the tray surface will often be adequate to neutralize the gradient. This means that the aperture inclined or normal planes containing the aperture will be few in number, so that it is entirely feasible to punch the apertures in a predetermined pattern tailored to the tray geometry and expected load conditions. It also means that apertures of relatively small dimension may be used which are relatively insensitive to changes in vapor flow. This rangeability of apertures, in turn, permits standardizing the size and geometry of the apertures for a wide variety of load conditions, so that a single shape and size of aperture will usually accommodate all usage of this invention in a given service thereby simplifying tray fabrication.

In the practice of this invention, it is preferable to match the wet tray pressure drops of the perforations integral with the tray and usually normal to the tray surface, and the aperture formed by a punching operation which apertures may or may not be inclined to the tray surface. This insures uniform bubbling activity on the tray and it also avoids weeping from either aperture or perforation. The wet tray pressure drop ($\Delta hw$), usually measured in millimeters or inches of tray liquid, is the resistance to vapor flow through the apertures or perforation due to surface tension of the liquid, at incipient bubbling conditions, exclusive of hydrostatic head. It is readily determined by measuring the pressure drop across an aperture or perforation covered by a known depth of actual column liquid while maintaining only enough vapor flow to produce bubble growth. This measurement, reduced by any hydrostatic head included therein, is the wet plate pressure drop. The value of the wet plate pressure drop depends on the size of the aperture and perforation and on the surface tension of the column liquid. For liquid of a given surface tension, very small apertures and perforations exhibit high values of $\Delta hw$ and tend toward high compression costs to operate the column. Large apertures and perforations exhibit low values of $\Delta hw$ and tend toward weeping or dumping, especially at low vapor rates. For satisfactory performance, we have found that the formed apertures and the perforations integral with the tray and normal to the plane of the tray should be sized to exhibit a value of $\Delta hw$ between 0.05 and 0.5 inch of column liquid. Below 0.05 inch excessive weeping of the column liquid through the tray could occur thereby decreasing tray efficiency. Values of $\Delta hw$ above 0.5 inch of column liquid would increase compression costs thereby reducing the economy of the process. The size of the formed apertures should be chosen so that their $\Delta hw$ is not greatly different from that of the perforations integral with the tray and normal to the tray surface. For best performance, $\Delta hw$ for the formed apertures should be somewhat less than for the perforation integral with the tray and normal to the tray surface and preferably should be between 70 and 100 percent of the $\Delta hw$ for the perforations integral with the tray.

To illustrate an optimal range of size for circular perforations normal to the surface of the tray, a range of diameters has been established for air separation. A range of 0.015 to 0.125 inch was found to operate satisfactorily. For mechanical reasons, sheet metal cannot be thicker than the punched-hole diameter. Normal perforations having a diameter smaller than 0.015 inch will therefore necessitate the use of a tray material which is too thin to provide level support for the liquid. A further disadvantage also results if the perforation diameter is less than 0.015 inch, i.e. the pressure drop across the trays becomes high and power losses increase. Above a diameter of 0.125 inch normal vapor loading would be insufficient to keep the tray from weeping, thereby reducing tray efficiency.

Table I presents several examples of trays having formed apertures and perforations used in air separation to illustrate the distribution of total open tray area, i.e. the area given to perforations normal to the tray surface and the area given to formed apertures.

TABLE I

| Tray diam., in. | Press p.s.i.g. | Superficial vapor velocity, ft./sec. | Reflux ratio L/V, lb. liquid lb. vapor | Perforation density, holes/ sq. in. | Formed aperture density formed apertures/ sq. in. | Percent open area (total) | Fraction of open area as formed apertures, percent |
| --- | --- | --- | --- | --- | --- | --- | --- |
| 40 | 66 | 0.78 | 0.54 | 59 | 3.4 | 7.6 | 21.0 |
| 50 | 4 | 2.05 | 0.49 | 98 | 2.6 | 11.2 | 10.6 |
| 50 | 5 | 1.73 | 0.99 | 59 | 2.0 | 7.0 | 14.0 |
| 80 | 8 | 1.54 | 1.43 | 69 | 2.6 | 8.2 | 14.6 |
| 95 | 5 | 1.73 | 0.52 | 98 | 2.2 | 11.0 | 9.1 |

NOTE.—It is of interest to note the wide variation in total percent open area, and that the range includes very high values of this factor.
PAT. NO.: 3,603,129

EXAMPLE I

Tests comparing the performance of this invention with a standard sieve tray were conducted for the air-water system using a tray in the form of a trough 10.5 feet long and 0.056 foot wide. The tray material was standard sieve material having 80 holes or perforations per square inch and having a diameter of 0.036 inch, each perforation being normal to the tray surface. The same material was then used to construct the formed aperture-sieve tray of this invention. In addition to the 0.036-inch-diameter perforations normal to the tray surface, a group of apertures were formed on the surface of the tray. The formed apertures measured 0.025 inch high by 0.1875 inch long. The aperture density was four formed apertures per square inch. The results of this tray comparison are presented in table II.

dicate only partial tray activity. Values equal to one (1) indicated incipient bubbling conditions.

From the results listed in table II, it is seen that by adding formed apertures, the hydrostatic gradient is greatly reduced and in some cases virtually eliminated. The low absolute values of the residual gradients in the formed aperture-sieve tray indicate that almost perfect fluid distribution is achieved. In spite of the fact that both liquid and vapor loading conditions were varied drastically, by a factor of about 2, the formed aperture-sieve tray remained stable as shown by the high values of the bubbling index. On the other hand, the standard sieve tray was highly active only at the one condition corresponding to highest vapor velocity (4.35 ft./sec.). At intermediate vapor velocity (3.27 ft./sec.), the standard sieve tray was at the threshold of inactivity. Finally, it is seen that the use of formed apertures reduced significantly the overall pressure

TABLE II.—TEST RESULTS OF THE SYSTEM AIR-WATER

| | | Standard sieve tray | | | Formed aperture-sieve tray | | |
| --- | --- | --- | --- | --- | --- | --- | --- |
| $V_s$, ft./sec. | $Q_L$/b., cu. ft. sec./ft. | Hydrostatic gradient mm. of tray liquid | Total tray phase P mm. of tray liquid | Bubbling index | Hydrostatic gradient mm. of tray liquid | Total gas phase P mm. of tray liquid | Bubbling activity |
| 4.35 | 0.139 | 22 | 97 | 1.3 | 6 | 79 | 1.6 |
| 3.27 | 0.104 | 19 | 85 | 1.0 | 5 | 72 | 1.3 |
| 3.27 | 0.0882 | 18 | 84 | 1.0 | 3 | 71 | 1.5 |
| 2.18 | 0.0718 | 18 | 71 | .7 | 2 | 65 | .9 |

Wherein:

$V_s$ is the superficial vapor velocity and is computed as the total volume of vapor flowing through the tray in unit time divided by the active, or open, surface area on the tray.

QL is the liquid flow rate across the tray expressed as cubic feet of liquid traversing each foot width of flow path in unit time.

Hydrostatic gradient is the difference in actual hydrostatic head which exists across a measured length of liquid flow path. The values of hydrostatic gradient listed in table I were measured between points 9 feet apart along the flow path. The difference in hydrostatic head along the tray is the difference in flow resistance encountered by vapor passing through the tray. Therefore, a low value of the hydrostatic gradient is indicative of good distribution of vapor flow across the tray surface.

Total gas phase P is the overall loss of pressure of the vapor in passing through the tray and liquid.

The Bubbling Index is an empirical index used during tests to qualitatively measure the tray activity. Values of one (1) or greater indicate a fully active tray. Values below one (1) indrop through the tray at any given liquid and vapor load.

EXAMPLE II

The results listed below in table III were conducted in actual air separation column under normal operating conditions. The trays were 52-inch-diameter circular flow trays substantially identical to FIG. 4. The standard sieve tray was 0.04 inch thick with 0.036-inch-diameter perforations normal to the tray surface and distributed uniformly at a density of 80 perforations per square inch. The formed aperture-sieve tray, which was made from the same material as the standard sieve tray, had formed apertures 0.1875 inch long and 0.025 inch high. The formed aperture density varied from 1 per square inch near the tray center to 4 per square inch near the periphery of the circular flow tray. As previously discussed, this variation in formed aperture density was employed to compensate for the increasing flow path which the liquid experiences as the diameter increases. To compensate for the shorter flow path near the center of the tray, the liquid on the periphery of the tray must be given a higher velocity so that the major portion of the liquid on any given tray will have had essentially the same residence time on that tray.

TABLE III.—TEST RESULTS OF THE SYSTEM LIQUID NITROGEN-GASEOUS NITROGEN

| | | Non-slotted tray | | Formed aperture-sieve tray | |
| --- | --- | --- | --- | --- | --- |
| $V_s$, ft./sec. | $Q_L$/b., cu. ft. sec./ft. | Total hydrostatic gradient mm. of tray liquid | Total gas phase P mm. of tray liquid | Total hydrostatic gradient mm. of tray liquid | Total gas phase P mm. of tray liquid |
| 1.36 | .0386 | 23 | 67 | 3 | 43 |
| 1.48 | .0314 | 13 | 53 | 8 | 40 |
| 1.51 | .0463 | 17 | 65 | 3 | 47 |
| 1.81 | .0542 | 20 | 73 | 0 | 50 |

NOTE.—The table headings are defined essentially as in Table II.

The tests of this example were conducted at a selected level in an operating air-separation unit. A comparison of the results listed in table III with table II demonstrates that similar advantages over standard trays are encountered. There is a vast improvement in the total hydrostatic gradient which indicates that the resistance to vapor flow is essentially constant throughout the surface of the tray thereby eliminating weeping and blowing.

The unique performance characteristics of this invention may be translated into several important advances in the liquid gas contacting art. For example, with a given size column and a given throughput, the pressure drop and hence power cost can be reduced; for a given size column and given pressure drop the productive capacity or throughput can be increased, and for a given throughput and given pressure drop the size of the column can be reduced thereby substantially reducing the initial investment.

Figure 1:
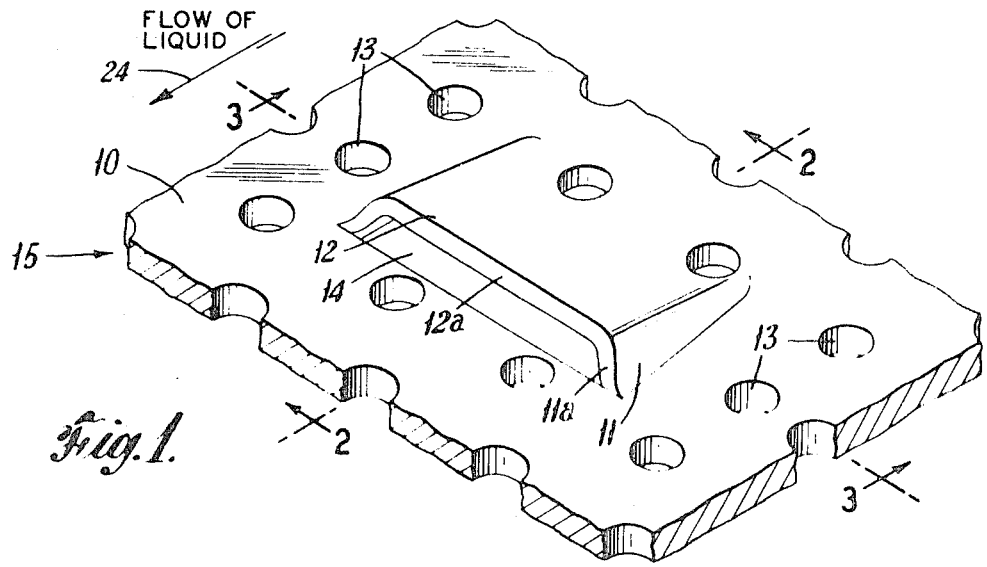
FIG. 1 is an isometric view of a portion of an exemplary tray according to this invention showing the relationship of one of many apertures with respect to normal perforations extending through the tray.

Referring now to the drawings, the FIG. 1 embodiment of this invention shows a portion of an exemplary tray of this invention having a main flat surface 10. Situated on this main flat surface 10, are a number of perforations 13 normal to the main flat surface 10 and extending through the tray 15. Also on the main flat surface 10 are a number of raised sections formed from the tray having a top surface 12 inclined to the main flat surface 10 and integral therewith. These raised sections also have sides 11 which are also inclined to the main flat surface 10 and integral therewith; the top surface 12 and the inclined sides 11 have leading edges 12A and 11A respectively above the main flat surface 10. The flat surface just below leading edge 12A, the leading edge 12A, and the leading edges 11A of included sides 11 are situated such that they form an aperture 14 having an aperture plane which may be normal to the main flat surface 10 or slightly inclined to the main flat surface 10 depending upon the manner in which the raised sections are initially formed.

Figure 2:
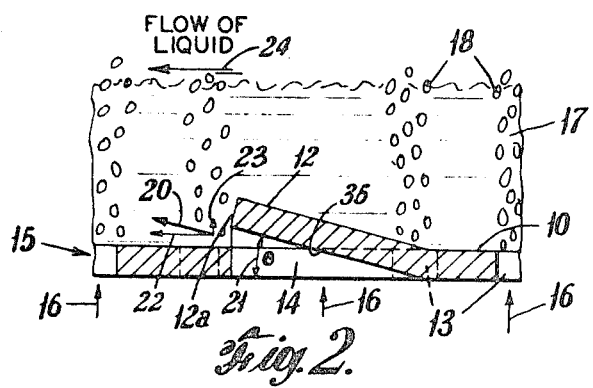
FIG. 2 is a view in section taken in the direction 2—2 of a portion of such tray with liquid thereon, illustrating an aperture profile and representative tray behavior during operation.

FIG. 2 is section (2—2) through FIG. 1 showing the profile of an inclined aperture and representative tray behavior during operation. A process vapor 16 rising through a liquid gas contacting apparatus having liquid gas contacting trays 15 is only allowed to flow through the perforations 13 and formed apertures 14. The portion of the vapor passing through the perforations 13 normal to the tray surface 10 proceeds through a process liquid 17 contained on the tray 15 and forms bubbles 18 while passing through the process liquid 17. In this manner, intimate contact between liquid 17 and vapor 16 is achieved. The vapor 16 passing through aperture 14 does not leave the surface of the tray normal thereto as does the vapor passing through perforations 13. Instead, the vapor 16 impinges on underside surface 35 and is directed obliquely into process liquid 17. In this manner, the underside surface 35 acts as a gas-flow-directing surface. It should also be noted that the aperture opening 14 functions as a throat, i.e. it converts pressure drop to kinetic energy. The kinetic energy or vapor thrust 20 associated with this portion of the vapor is at an angle theta ($\theta$) 21, to the tray surface 10. This inclined force vector 20 may then be resolved into its horizontal 22 and vertical 23 components. The horizontal component 22 is directed into and absorbed by the process liquid 17 thereby causing the process liquid 17 to flow in the direction indicated 24.

Figure 3:
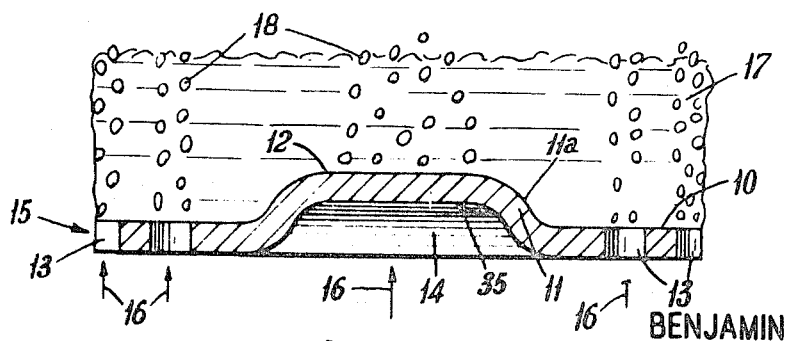
FIG. 3 is a view in section taken in direction 3—3 of a portion of the contacting tray illustrating an aperture and representative tray behavior during operation.

FIG. 3 is section (3—3) through FIG. 1 showing an inclined aperture profile and representative tray behavior during operation. A process vapor 16 raising through a liquid gas contacting tray 15 is only allowed to flow through the tray openings 13 and 14. The portion of the vapor passing through the perforations 13 normal to the tray surface 10 proceeds through a process liquid 17 contained on the tray 15 and forms bubbles 18. The vapor 16 passing through aperture 14 is not normal to tray surface 10 as is the vapor 16 passing through perforation 13. In this view, the flow of liquid 17 is directed at the viewer.

FIG. 4 is a perspective view of a circular flow tray embodying the principles of this invention. As has been previously discussed, the flow path of a process liquid contained on the main flat surface 110 of the tray 115 will increase from the center 124 of the tray to the tray periphery 125. In order to allow given volumes of liquid contained on the tray 110 to have the same residence time on the tray, the liquid near the periphery 125 must be moved faster than liquid located in the vicinity of the center 124 of the tray. To accomplish equal residence time, the formed aperture density must be increased from the center 124 to the periphery 125 of the tray. In this manner, an increasingly greater amount of kinetic energy is transferred to the liquid as one proceeds from the center 124 of the tray to the periphery of the tray 125. This increase of kinetic energy imparts a greater velocity to the liquid at the periphery than it does to liquid at the center. This increase is qualitatively shown by the increasing size of the velocity vectors 126.

FIG. 5, consisting of four parts, 5a, 5b, 5c and 5d, illustrates several formed aperture embodiments which may be used in lieu of the preferred formed aperture construction illustrated and discussed in preceding FIGS. 1, 2, 3 and 4.

Figure 5A:
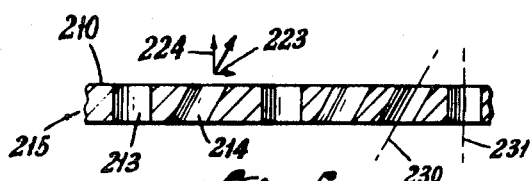

FIG. 5a illustrates a portion of a liquid gas contacting tray of this invention having a main flat surface 210 and having first and second apertures 213 and 214 as well as the first aperture 213, is flush with the main flat surface 210 but having its central axis 230 inclined obliquely to the main tray surface 210 as opposed to the axis 231 of the first aperture 213 which is normal to the tray surface. In this manner, vapors passing through the second apertures 214 will have horizontal and vertical force components, 223 and 224 respectively, with respect to the tray surface 210.

Figure 5B:
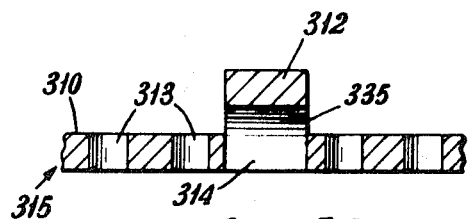

FIG. 5b illustrates a portion of a liquid gas contacting tray of this invention having a main flat surface 310 and having circular first apertures 313 and tonguelike section 312 raised from the main flat surface 310, and having open sides. The underside 335 of the tonguelike section 312 and the main flat surface 310 forming a second aperture 314 which directs a process vapor passing therethrough such that a portion of the kinetic energy possessed by the raising vapor is utilized to propel a process liquid contained on the surface 310 of the tray across the tray in the direction of a liquid downcomer. The formed aperture of this FIG. (FIG. 5b) differs from the formed aperture illustrated in FIGS. 1, 2 and 3 in that the sides as well as the end are at least partially open. Thus, in FIG. 1, the inclined sides 11 are joined to flat surface 10 so that the sides are sealed against vapor flow. The formed aperture illustrated herein (FIG. 5b) is open along the sides, as would occur if three sides of the tongue were sheared from the flat material during the forming operation.

Figure 5C:
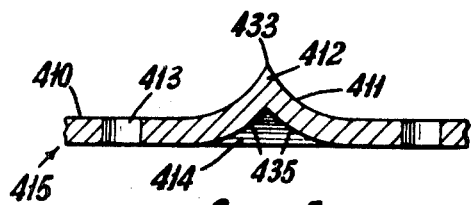

FIG. 5c illustrates a portion of a liquid gas contacting tray of this invention having a main flat surface 410 and having a circular first aperture 413 and having raised section 412 with pitched sides 411 terminating at an apex 433. The undersides 435 of the pitched sides 411 and the main flat surface 410 forming a triangular-shaped second aperture capable of directing a rising process vapor passing therethrough obliquely into a process liquid contained on the tray 415 thereby permitting a portion of the kinetic energy contained by the rising vapor to propel the process liquid across the tray in the direction of a liquid downcomer.

Figure 5D:
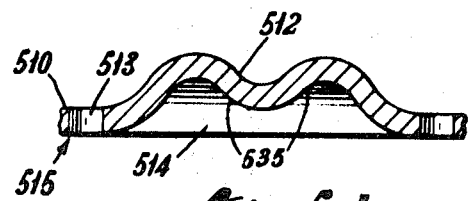

FIG. 5d illustrates a portion of a liquid gas contact tray of this invention which employs still another type of formed aperture. The tray has a main flat surface 510, a number of circular perforations 513 which are normal to the tray surface 510 and a formed aperture produced by an undulated raised section having elongated depressions. The aperture 514 thus formed is similar to FIG. 3 but differs in that one or more depressions 512 are formed in the leading edge bounding the top of the aperture.

For the purpose of utilizing this invention, it would be possible to invert the formed aperture configurations illustrated herein, i.e. to cause them to extend below the surface of the tray rather than above. The function of the apertures would not be changed but their ability to function efficiently would. There would be an increased hydrostatic head over each aper- Although preferred embodiments of the present invention have been described and illustrated in detail, it is understood that modifications thereto can be made all within the spirit and scope of this invention.

What is claimed is:

1. A method for manufacturing an improved liquid gas contacting tray comprising the steps of:
   a. providing a sheet member no thicker than 0.125 inch having flat upper and lower surfaces;
   b. pinching a plurality of uniformly sized circular perforation openings of diameter of at least 0.015 inch through said flat surfaces with walls perpendicular to said flat surfaces, said perforation openings being uniformly distributed across said surfaces;
   c. deforming discrete rectangular portions of the perforated sheet member distributed across the entire flat surfaces thereof so as to shape a lesser number of sections than perforation openings raised from and surrounded by said flat upper surface;
   d. shearing a front edge of each raised section from the sheet member to form an elongated aperture plane of greater width than height containing the edges of the sheared material with all such apertures being oriented in the same direction across the sheet member flat surfaces and the total open area of said apertures comprising less than about 20 percent of the total open area of said tray; and
   e. said deforming and shearing being such as to form said raised sections each with a raised top surface, two obliquely inclined sidewalls joining said raised top surface and said flat upper surface, and a back edge integral with said flat upper surface.

2. A method for manufacturing an improved liquid gas contacting tray comprising the steps of:
   a. providing a sheet member no thicker than 0.125 inch having flat upper and lower surfaces;
   b. punching a plurality of uniformly sized circular perforation openings of diameter between about 0.015 and 0.125 inch through said flat surfaces with walls perpendicular to said flat surfaces, said perforation openings being uniformly distributed across said surfaces;
   c. deforming discrete rectangular portions of the perforated sheet member distributed across the entire flat surfaces thereof so as to shape a lesser number of sections than perforation openings raised from and surrounded by said flat upper surface;
   d. shearing a front edge of each raised section from the sheet member to form an elongated aperture plane of greater width than height containing the edges of the sheared material with all such apertures being oriented in the same direction across the sheet member flat surfaces and the total open area of said apertures comprising less than about 20 percent of the total open area of said tray; and
   e. said deforming and shearing being such as to form said raised sections each with a raised top surface, two obliquely inclined sidewalls joining said raised top surface and said flat upper surface, and a back edge integral with said flat upper surface.

UNITED STATES PATENT OFFICE
CERTIFICATE OF CORRECTION

Patent No. 3,603,129      Dated September 7, 1971

Inventor(s) B. Williams and E. F. Yendall

It is certified that error appears in the above-identified patent and that said Letters Patent are hereby corrected as shown below:

Claim 1, (b), line 1, delete "pinching" and substitute --punching--.

Signed and sealed this 18th day of January 1972.

(SEAL)
Attest:

EDWARD M. FLETCHER, JR.        ROBERT GOTTSCHALK
Attesting Officer              Acting Commissioner of Patents